United States Patent
Son et al.

(10) Patent No.: US 8,024,508 B2
(45) Date of Patent: Sep. 20, 2011

(54) COMPUTER STORAGE CONTROL

(75) Inventors: Sung-ho Son, Seoul (KR); Jeong Woo Lee, Suwon-si (KR)

(73) Assignee: LG Electronics Inc., Seoul (KR)

( * ) Notice: Subject to any disclaimer, the term of this patent is extended or adjusted under 35 U.S.C. 154(b) by 564 days.

(21) Appl. No.: 11/689,129

(22) Filed: Mar. 21, 2007

(65) Prior Publication Data

US 2007/0226403 A1   Sep. 27, 2007

(30) Foreign Application Priority Data

Mar. 21, 2006  (KR) .................. 10-2006-0025596
Mar. 21, 2006  (KR) .................. 10-2006-0025597

(51) Int. Cl.
*G06F 12/00* (2006.01)
(52) U.S. Cl. .............. 711/103; 711/E12.017; 710/314; 710/62
(58) Field of Classification Search .............. 711/113
See application file for complete search history.

(56) References Cited

U.S. PATENT DOCUMENTS

| | | | | |
|---|---|---|---|---|
| 5,860,083 A | * | 1/1999 | Sukegawa ............... | 711/103 |
| 5,928,365 A | * | 7/1999 | Yoshida .................. | 713/324 |
| 6,154,788 A | * | 11/2000 | Robinson et al. ........ | 710/8 |
| 6,614,685 B2 | * | 9/2003 | Wong ..................... | 365/185.11 |
| 2003/0033573 A1 | * | 2/2003 | Tamura et al. ........... | 714/763 |
| 2004/0260842 A1 | * | 12/2004 | Pettey et al. ............. | 710/1 |
| 2005/0182887 A1 | * | 8/2005 | Sakurai et al. ........... | 710/315 |
| 2007/0050540 A1 | * | 3/2007 | Klein ..................... | 711/113 |

FOREIGN PATENT DOCUMENTS

| | | |
|---|---|---|
| JP | 10-326227 A | 12/1998 |
| KR | 10-19980076475 A | 11/1998 |
| KR | 10-2003091498 A | 12/2003 |

OTHER PUBLICATIONS

Korean Office Action dated Apr. 7, 2011 for Application No. 10-2006-0025597, Non-English language, 4 pages.

* cited by examiner

*Primary Examiner* — Reginald Bragdon
*Assistant Examiner* — Hamdy Ahmed
(74) *Attorney, Agent, or Firm* — Fish & Richardson P.C.

(57) ABSTRACT

A flash memory-based storage grouped into memory regions is controlled by determining whether the flash memory is accessed or not. Power to a first of the memory regions is controlled according to the determination result. Power to a second of the memory regions is controlled according to the determination result. Controlling includes enabling provision of power to the first memory region while concurrently denying power to the second memory region.

32 Claims, 7 Drawing Sheets

FIG.10

COMPUTER STORAGE CONTROL

TECHNICAL FIELD

This document relates to computer storage control.

BACKGROUND

Figure 1:
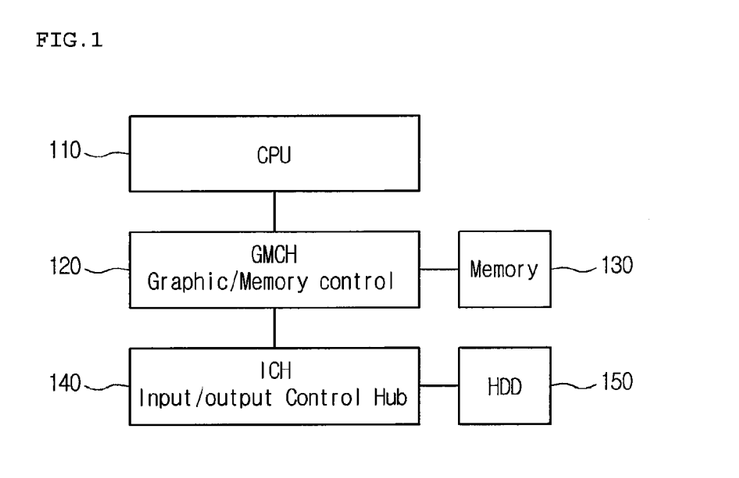
FIG. 1 is a block diagram of a conventional storage device in an HDD-based computer system.

Personal computers (PCs) and notebook computers generally include a hard disk drive (HDD) for use as a mass storage device. FIG. 1 shows a block diagram of a storage device in an HDD-based computer system. As illustrated in FIG. 1, the HDD-based computer system includes a central processing unit (CPU) 110, a graphic/memory control (GMCH) 120, a memory 130, an input/output control hub (ICH) 140, and an HDD 150. The HDD employed in the computer system stores and reads data on or from the HDD through HDD interfaces (i.e., serial advanced technology attachment (SATA) and parallel advanced technology attachment (PATA)).

SUMMARY

In one general aspect, a storage control device includes a hard disk drive (HDD) interface controller and a flash memory-based storage. The storage control device also includes a memory interface controller logically between the HDD interface controller and the flash memory-based storage. The HDD interface controller and the memory interface controller are configured to collectively enable the HDD interface controller to access the flash memory-based storage.

One or more of the following features may be included. For example, the HDD interface controller and the memory interface controller may be based on a peripheral component interconnect (PCI) Express 4× interface. In another example, the flash memory-based storage may be grouped into memory regions that are configured for independent control. In yet another example, the flash memory-based storage may be grouped into blocks that are configured for independent control. The flash-memory based storage may be physically or logically partitioned into partitions that are configured for independent control. The flash memory-based storage also may include a switch configured to supply power to each partition such that each partition is controlled through the switch. The memory interface also may include a counter configured to monitor access to the partitions such that power to a partition not accessed for a predetermined amount of time is denied through the switch. In another example, the flash memory-based storage may be configured to enable the HDD interface controller to access the flash memory-based storage. In yet another example, the HDD interface controller may be configured to enable access the flash memory-based storage.

In some implementations, the storage control device also may include a power controller configured to independently control power to the memory regions through switches corresponding to different of the memory regions. The switch may control power to each memory region by providing or denying power to each memory region. In another example, the memory interface controller also includes a counter that may be configured to monitor access to the memory regions such that power to a memory region not accessed for a predetermined amount of time is denied through the switch.

In some implementations, the flash-memory based storage may be a structure grouped as a plurality of memory regions, and includes a power controller controlling power to each grouped region. In another implementation, the power controller may provide or deny power to a corresponding memory region according to whether each grouped memory region is accessed or not. The flash memory-based storage may be grouped into blocks that are configured for independent control, or the flash memory-based storage may be physically or logically partitioned into partitions that are configured for independent control.

In another example, the storage control device also may include a parallel-based memory access interface structure provided between the memory interface controller and the flash memory-based storage. The memory interface controller also may include a converter configured to convert a corresponding data format when the flash memory is accessed from a host. The flash memory-based storage may be a structure in which the flash memory is grouped into memory regions, each memory region is defined as a block, and a flash memory access is executed in parallel to each block. The memory interface controller also may include a converter configured to convert a corresponding data format when the flash memory is accessed from a host.

In another general aspect, a storage control device includes a flash memory-based storage having a structure in which the flash memory is grouped into memory regions, a PCI express interface configured to connect the flash memory-based storage and a host through the PCI express interface, a format converter configured to convert data and address formats between a first format compatible with the PCI express interface and a second format during a memory access of the flash memory-based storage, and a flash memory interface configured to perform the memory access in parallel to each memory region by defining each of the memory regions as one block on the basis of the converted data and address formats.

One or more of the following features may be included. For example, the second format may be a format that is compatible with the flash memory interface.

In another general aspect, a method of controlling a storage of a computer system, which is a flash memory-based storage grouped into memory regions, includes determining whether the flash memory is accessed or not. The method also includes controlling power to a first of the memory regions according to the determination result, and controlling power to a second of the memory regions according to the determination result. The controlling includes enabling provision of power to the first memory region while concurrently denying power to the second memory region.

One or more of the following features may be included. Power to a memory region may be provided or denied according to whether each of the grouped memory regions is accessed or not. The flash memory-based storage may be grouped into blocks that are configured for independent control. The flash memory-based storage may be physically or logically partitioned into partitions that are configured for independent control. The flash memory-based storage may be grouped into sectors that are configured for independent control. Power to a grouped memory region may be denied when each of grouped memory regions is not accessed during a predetermined time. The determination of whether the flash memory is accessed or not may be a determination of whether the first and second of the memory regions is accessed.

DETAILED DESCRIPTION

Figure 2:
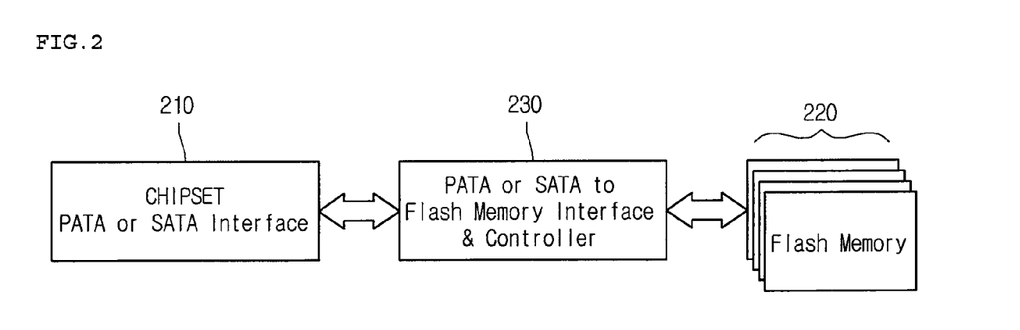
FIG. 2 is a block diagram of a flash memory-based storage control device.

Referring to FIG. 2, a computer system storage control device includes a first interface 210, a flash memory 220, and a second interface 230. The first interface 210 may be, for example, an interface with a standardized format such as a parallel advanced technology attachment (PATA) interface or a serial advanced technology attachment (SATA) interface. In another implementation, the first interface 210 may be a customized, or application-specific interface. The second interface 230 is placed between the flash memory 220 and the first interface 210 and configured as an interface between the flash memory 220 and the first interface 210. The second interface 230 is also a controller that enables the flash memory 220 to operate (and perhaps be perceived) as a hard disk drive (HDD). Like the first interface 210, the second interface 230 may be a customized, or application-specific, interface. The second interface 230 may additionally or alternatively be an interface that adheres to a standard memory interface specification.

Figure 3:
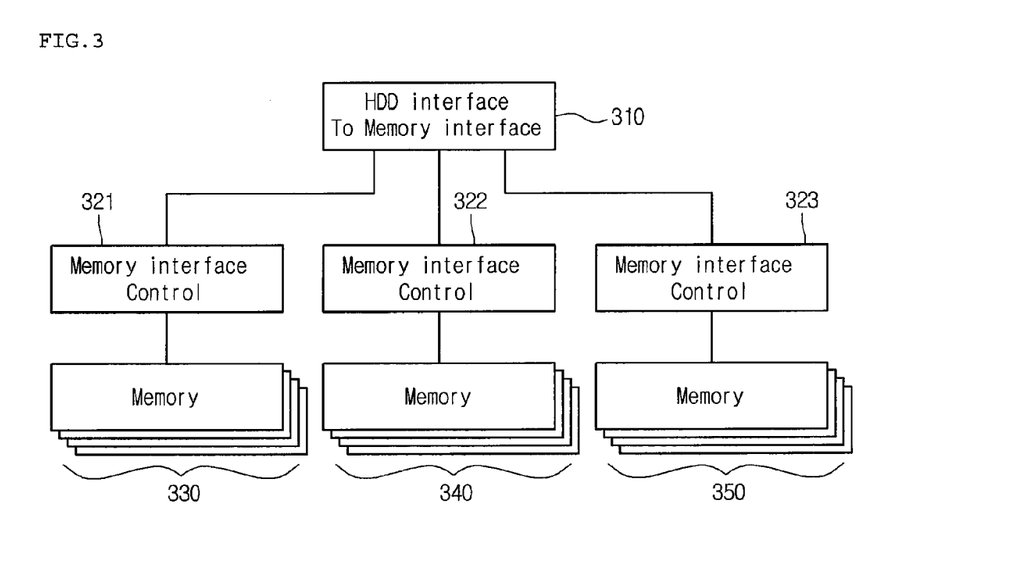
FIG. 3 is a block diagram of a flash memory-based storage control device.

In FIG. 3, a first interface 310 provides an interface between a system and flash memory interface controllers 321, 322, and 323. The first interface 310 may be an HDD interface that allows a flash memory to serve (or be perceived) as an HDD. Flash memory interface controllers 321, 322, and 323 are configured to control flash memories 330, 340, and 350, respectively, such that data may be read or written to the flash memories 330, 340, and 350. The flash memories 330, 340, and 350 may be divided into memory regions that may be controlled separately. For example, each of the flash memories 330, 340, and 350 may be divided into physical or logical partitions. In this implementation, the first interface 310 supplies a power control signal to each of the partitions, which may enable reduced power consumption by cutting off the power to the partitions that are not being accessed. In other words, the flash memories 330, 340, and 350 may be divided into separately powered memory block units such that power savings may be achieved by cutting off the power supply to blocks that are not being accessed.

Figure 4:
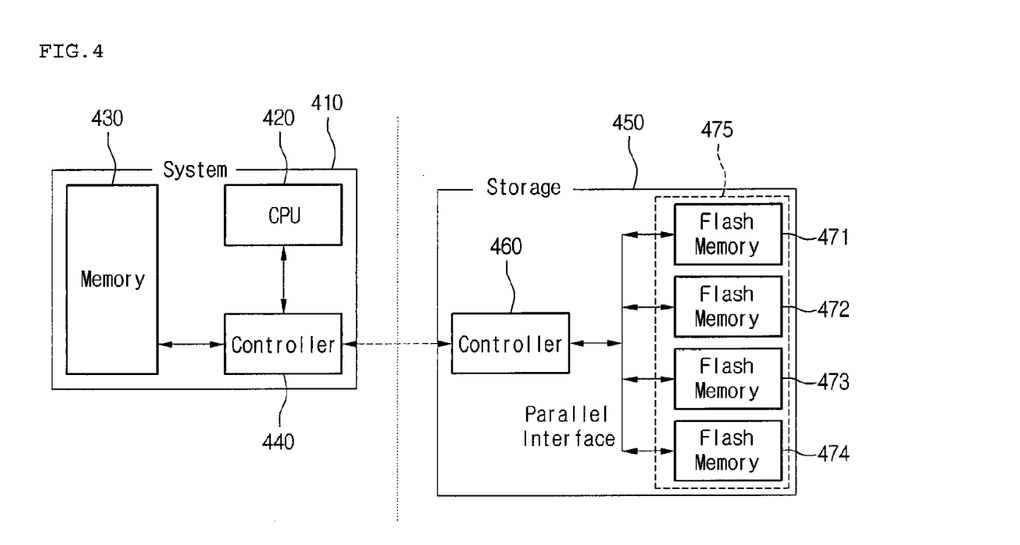
FIG. 4 is a block diagram of a flash memory-based storage control device in a computer system.

Referring to FIG. 4, a system 410, which may include a CPU 420, a memory 430, and a system controller 440, interfaces with a storage device 450. The storage unit 450 may include a storage controller 460 and flash memories 471, 472, 473, and 474. An array of flash memory 475 may include flash memories 471, 472, 473, and 474. A PCI express interface enables data read and write operations to be performed between the system controller 440 and the storage controller 460. The storage controller 460 may control the array of flash memory 475 through a parallel interface.

An interface between the system controller 440 and the storage controller 460 may include, for example, a PCI Express 4× Bus operating at 1.8 GB/sec. The interface enables parallel multi-bit (e.g., 64 bit) access to the array of flash memory 475. For example, the interface may enable simultaneous read or write access to the flash memories 471, 472, 473, and 474. As a result, the read and write speed to the array of flash memory 475 may be improved. The storage controller 460 may be connected between a host device of a computer and the array of flash memory 475 to deliver input/output data from the host device to the array of flash memory 475, and vice versa.

The array of flash memory described in the context of FIGS. 3 and 4 may include N blocks of flash memory, which may be divided into M pages. Operations such as, for example, data record, data erase, and data read, may be performed in block units. In this implementation, the interface controllers, such as, for example, flash memory interface controllers 321, 322, and 323 described with respect to FIG. 3, may address the flash memory. The interface controllers may also read and write data according to, for example, a chip enable (CE) signal, a read enable (RE) signal, a write enable (WE) signal, a command latch enable (CLE) signal, an address latch enable (ALE) signal, a write protect (WP) signal, a command, or power voltages (e.g., VCC and VSS).

Figure 5:
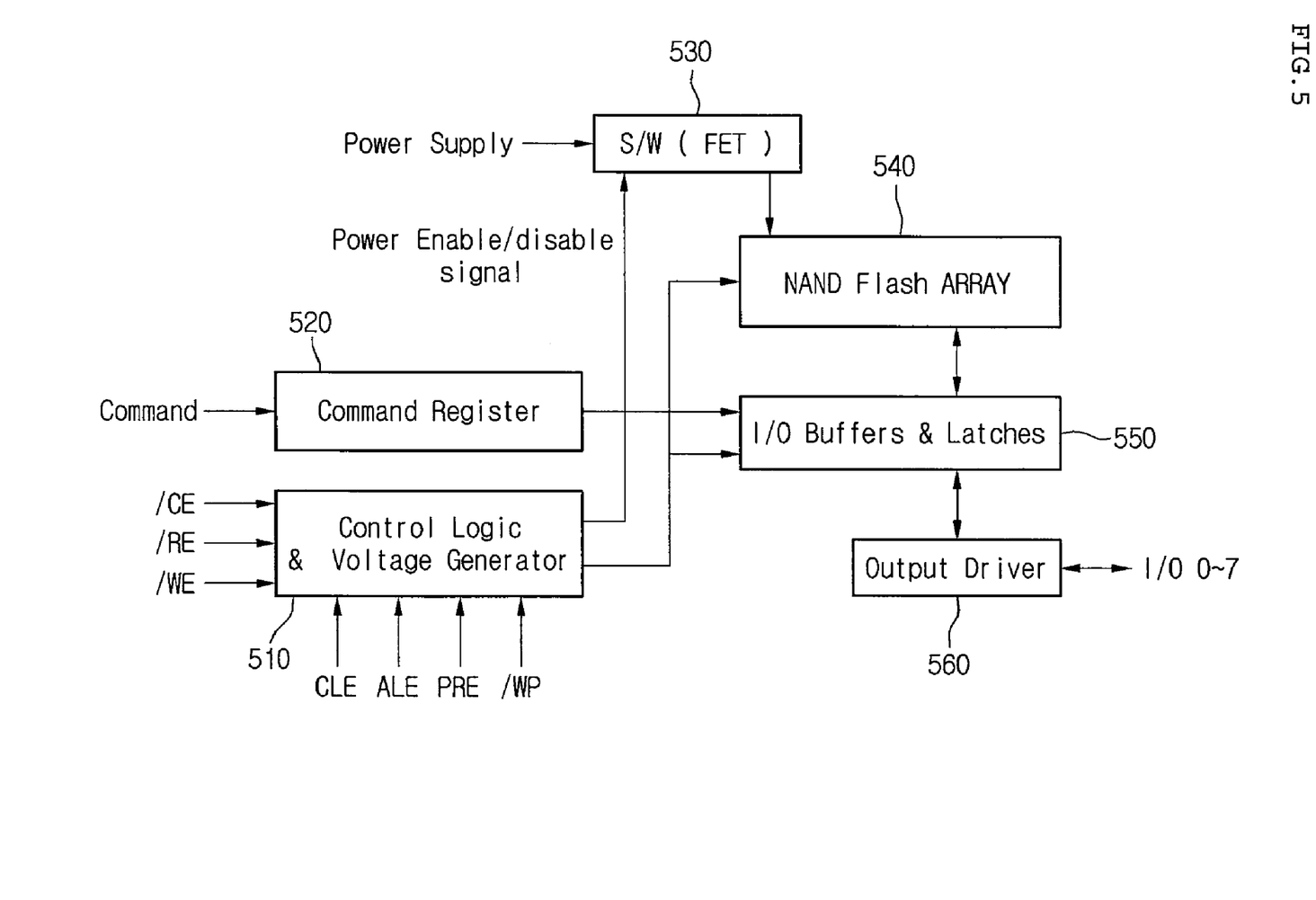
FIG. 5 is a block diagram of a storage power control device.

Referring to FIG. 5, a storage power control device includes a control logic and voltage generator 510, a command register 520, a switch (FET) 530, a NAND flash array 540, input/output (I/O) buffers and latches 550, and an output driver 560.

The control logic and voltage generator 510 may perform memory read/write operations by controlling the NAND flash array 540, the I/O buffers and latches 550, and the switch 530 to perform memory read/write operations according to a data read/write control signal from a host such as, for example, a chip enable (CE) signal, a read enable (RE) signal, a write enable (WE) signal, a command latch enable (CLE) signal, an address latch enable (ALE) signal, and a write protect (WP) signal. The command register 520 may perform read/write operations by controlling the I/O buffers and latches 550 according to a data read/write control command from a host. The output driver 560 may drive input/output data of the I/O buffers and latches 550 using, for example, an 8-bit input/output port I/O 0-7.

In one implementation, the NAND flash array 540 may include several memory blocks, and the switch 530 controls a power supply to the NAND flash array 540 through a control logic and voltage generator 510. For this purpose, the control logic and voltage generator 510 applies a power enable/disable signal to the switch 530. The switch 530 is turned on or off in response to the power enable/disable signal. The switch 530 is turned on to supply power to the NAND flash array 540 in response to the power enable signal, and the switch 530 is turned off to remove power to the NAND flash array 540 in response to the power disable signal. This implementation may enable block-by-block control of the power supply to the blocks. Thus, power consumption may be reduced by cutting off power to blocks that are not being accessed.

Figure 6:
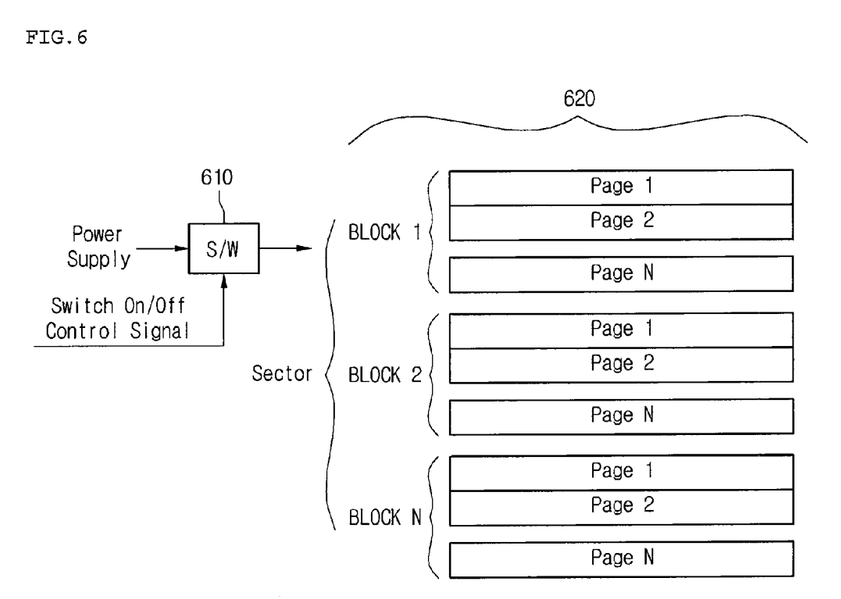
FIG. 6 is a block diagram of a sector in a storage device power controller.

FIG. 6 shows an implementation in which a switch 610 may control the power supplied to a sector of flash memory 620. A sector may be a grouping of N flash memory blocks. In one implementation, the switch 610 may control a power source to a sectors by grouping N blocks of flash memory, BLOCK 1, BLOCK 2, . . . , BLOCK N, as one sector 620. In this implementation, the number of control signals may be reduced. The control logic generally becomes complicated when the flash memories are controlled separately because each flash memory requires a control signal. However, in the implementation described above, the flash memories may be controlled by grouping a predetermined memory capacity unit as one block. Thus, the number of control signals may be reduced by enabling control through a partition unit divided into a predetermined capacity.

Figure 7:
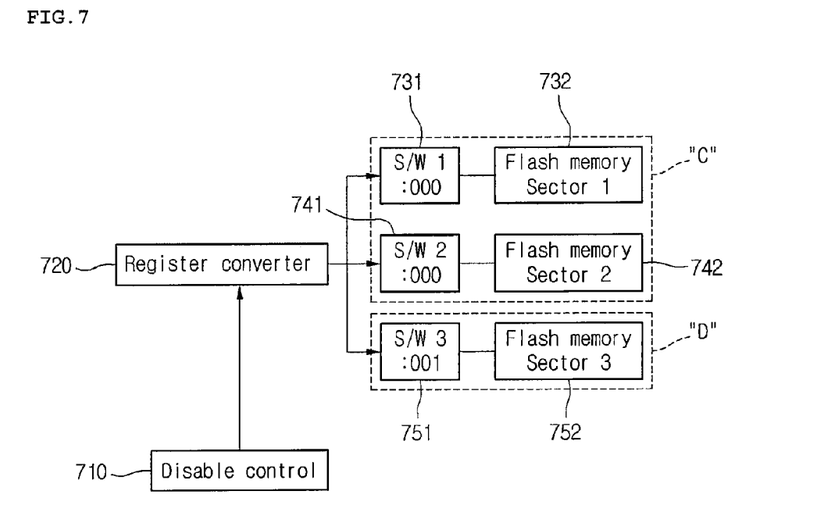
FIG. 7 is a block diagram of a storage partition in a storage power control device.

Referring to FIG. 7, a storage partition in a storage power control device includes a disable control 710 and a register converter 720. The storage partition also may include a first control switch 731 and a first flash memory sector 732, a second control switch 741 and a second flash memory sector 742, and a third control switch 751 and a third flash memory sector 752. In the example shown in FIG. 7, the settings of the first control switch 731 and the second control switch 741 are both set to "000." The first memory sector 741 and the second memory sector 742 may then be partitioned as a hard disk drive (e.g., the "C" drive). Additionally, the third control switch 751 may be set to another value, such as "001." The third memory sector 743 may then be partitioned as another hard disk drive (e.g., the "D" drive).

Through the disable control 710, the register converter 720 may change the settings of any of the control switches 731, 741, and 751 to "000" to disable the control switch, which cuts off a power source to the flash memory sector corresponding to the control switch. Power consumption may thus be reduced by eliminating the power source to a drive (e.g., a "C" or "D" drive partition) that is not being accessed. Similarly, the register converter 720 may change the settings of any of the control switches 731, 741, and 741 to "001" to enable the control switch. Enabling the control switch causes power to be supplied to the flash memory sector corresponding to the control switch.

Figure 8:
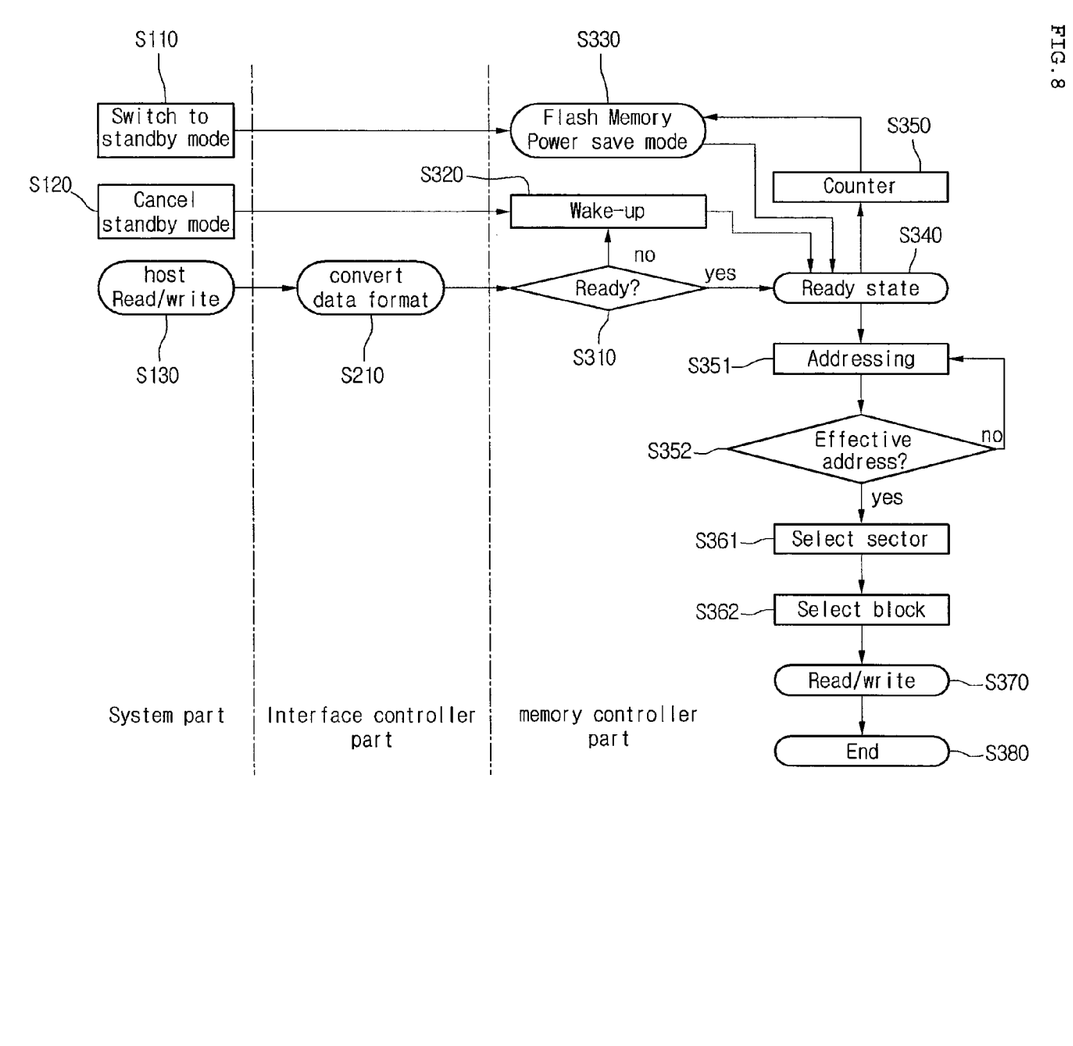
FIG. 8 is a flowchart illustrating a process of controlling a storage device.

Referring to FIG. 8, an exemplary process for controlling a storage device may include operations in a system part, an interface controller part, and a memory controller part.

The system part may include a switch to standby mode operation S110. The system part also may include a cancel standby mode operation S120. The system part may further include a host read/write operation S130. For example, the switch to standby mode operation S110 may be a command to control a flash memory such that it is placed in a power-saving mode. The switch to standby mode operation S110 may occur when a system controller, such as system controller 440 described with respect to FIG. 4, signals the system part to switch the flash memory into standby mode because there has been no attempted access to the flash memory for a predetermined amount of time. The cancel standby operation S120 is a command to switch the flash memory from the power-saving mode to a ready mode in which data may be read from and written to the storage device. A read or write operation to the storage device when the storage device is in standby mode triggers the cancel standby mode operation S120.

The interface controller part may convert data between a system interface format and a native flash memory format. When the system part performs a host read or write operation S130, the interface controller part may perform a convert data format operation S210. The convert data format operation S210 is an operation in which the interface controller part converts data between the system interface format and the native flash memory format. For example, during the convert data format operation S210, the interface controller part may convert the data format between one compatible with a flash memory interface and one compatible with a system interface, such as PCI Express interface, a PATA interface, or SATA interface, and package the data so that it can be transported across a PCI Express bus or a PATA or SATA bus.

Figure 10:
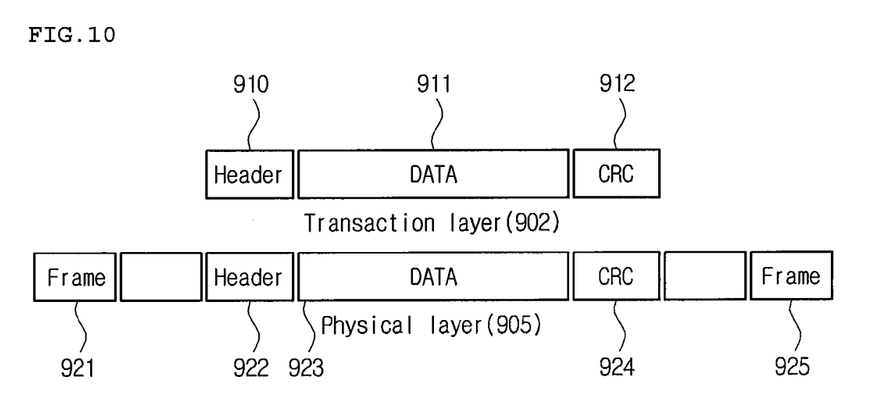
FIG. 10 illustrates a layer structure of a Peripheral Component Interconnect (PCI) Express.

Describing one implementation in greater detail, a flash memory data architecture includes a header and a data block. The header includes a data type, an input/output function definition, and a command. The data block includes an address and data. Referring to FIG. 10, a PCI express architecture includes a frame 921, a header 922, data 923, and cyclic redundancy check (CRC) 924. The header and data block of the flash memory data architecture are inserted into the data 923 of the PCI express architecture. Accordingly, if the header 922, the frame 921, and the CRC 924 are added to the data of the PCI express architecture, data formatting information for the flash memory data of data 923 may be accommodated, and thus, effectively added to the flash memory data architecture. This method may be applied to a SATA or PATA bus conversion.

In some implementations, the convert data operation S210 may convert data from a format compatible with the system interface to one compatible with a hard drive interface and from a format compatible with a hard drive interface to a format compatible with the flash memory interface. In other implementations, additional or fewer conversion steps may be required.

The memory controller part includes a memory ready query S310. When performing the convert data format operation S210, the interface controller part may trigger the memory ready query S310 to determine whether the flash memory is in a ready state such that data may be written to or read from the flash memory. If the memory ready query S310 determines that the flash memory is not in a ready state, the memory ready query S310 triggers a wake-up operation S320. The wake-up operation S320 triggers the flash memory to transition into a ready state S340 such that data may be written to or read from the flash memory. To transition the flash memory into the ready state S340, a power source is applied to the corresponding blocks (or partitions) of the flash memory by turning on the control switches for those blocks or partitions.

The switching of the standby mode operation S110 also may cause the memory controller part to transition into the flash memory power save mode S330. The flash memory power-saving mode accomplishes power-savings by cutting off a power to each identified flash memory sector or block. The cancel standby mode operation S120 also may trigger the wake-up operation S320.

When the ready state is determined, a corresponding ready state is performed in operation S340. An example of a ready state is when the flash memory is supplied with power. Supplying the flash memory with power enables data to be read from and written to the flash memory. An example of a corresponding ready state is that a data is ready to be read or be written. The memory controller part also includes a counter operation S350. When the memory controller part is in the ready state, the memory controller part triggers the counter operation S350. The counter operation monitors access to the flash memory. When there has been no (or less than a threshold number of) read or write operations to the flash memory for a predetermined amount of time, the counter operation S350 causes the flash memory to transition from the ready state S340 into the flash memory power save mode state S330.

When the flash memory is accessed, the memory controller part performs addressing operation S351. Addressing operation S351 uses a memory address defined with respect to the system interface to identify a memory address defined with respect to the flash memory. The memory controller part then determines whether an identified memory address is effective or not in operation S352. When the identified memory address is not effective, the memory controller part returns to addressing operation S351 for identification of another candidate memory address. Once an effective memory address has been identified, however, the corresponding flash memory sector is selected in a select sector operation S361. Next, a corresponding block is selected in a select block operation S362, and a read/write operation S370 may be performed on the basis of addressing of the selected block. The process terminates in operation S380.

Figure 9:
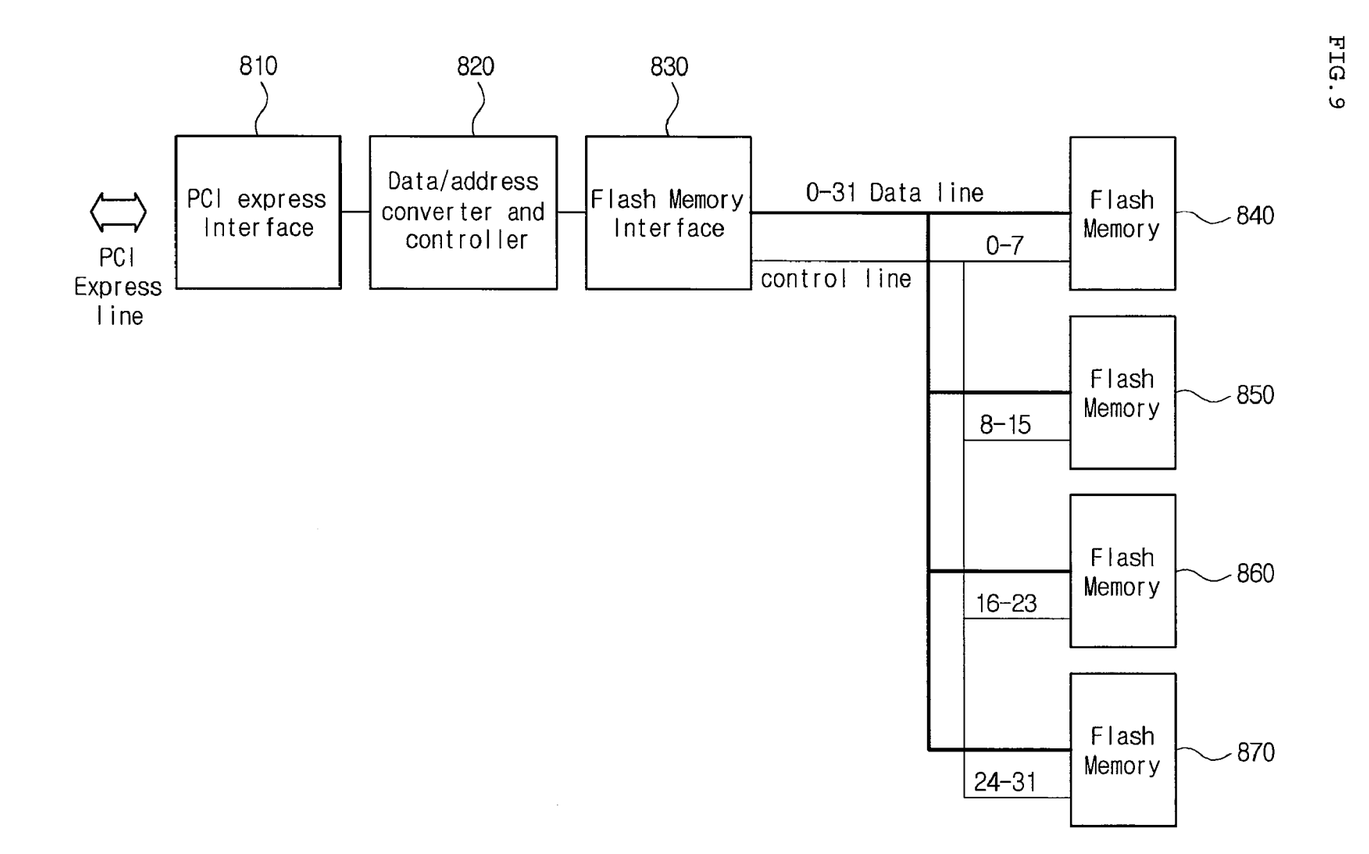
FIG. 9 is a block diagram of a storage device controller and an array of flash memory.

Referring to FIG. 9, a storage control device includes a PCI Express Interface 810, a data/address converter and controller 820, a flash memory interface 830, and flash memories 840, 850, 860, and 870.

The PCI Express interface 810 may be connected to an HDD control interface of a host using, for example, the PCI Express 4× Bus as described above with respect to FIG. 4. The data/address converter and controller 820 converts a corresponding data and address format when the host performs a flash memory access operation. In this implementation, the data format through the HDD bus (e.g., PCI Express, PATA, or SATA) may be converted to a data format that is compatible with the flash memory interface 830.

Additionally, the data/address converter and controller 820 may control a data transfer between the flash memory interface 830 and the flash memories 840, 850, 860, and 870 according to a data reading/writing control from the host on the bases of a chip enable (CE) signal, a read enable (RE) signal, a write enable (WE) signal, a command latch enable (CLE) signal, an address latch enable (ALE) signal, and a write protect (WP) signal.

The flash memory interface 830 controls a necessary data reading/writing by controlling the input/output buffering and latch on the basis of command according to the data read/write control from the host.

In the example shown in FIG. 9, the flash memories 840, 850, 860, and 870 have a 54 MB/sec speed, the flash memory interface 830 may access to the flash memories 840, 850, 860, and 870 with a 15 MB/sec×4=60 MB/sec speed in a total 32 bit Bus. Accordingly, sufficiently fast data access is possible with a speed defined in the PCI Express Line. In FIG. 9, 32-bit data lines 0 to 31 may be assigned to the flash memories 840, 850, 860, and 870, each having 8 bits (1 byte). In this implementation, bandwidth may be increased by connecting the flash memories in parallel.

When a host read/write command (i.e., a flash memory access) is attempted, the interface controller converts a corresponding data format during data reading or writing of the flash memory by converting the data and address format. After the host read/write command and the data format conversion state, the corresponding address is converted. Then, it is determined whether the address is effective or not. It is returned to the address conversion operation when the address is not effective, and a corresponding sector is selected when the address is effective. Next, a corresponding block is selected and data reading/writing is performed on the basis of addressing and a control line of the selected block.

Referring to FIG. 10, a layer structure of a PCI Express may include a transaction layer 902 and a physical layer 905. In the transaction layer 902, the data 911 may be created in the PCI Express format by adding a header 910 and cyclic redundancy check (CRC) 912 to the data 911. In the physical layer 905, data in the PCI Express format may be created by adding a header 922, frames 921 and 925, and a CRC 924 to data 923.

Accordingly, in the PCI Express interface 810 of FIG. 9, actual data may be exchangeable between the host and the flash memory by separating the actual data and converting the data to be compatible with the flash memory again.

Some of the above and other implementations may be configured to reduce or eliminate noise, power consumption, and heat generation.

It will be understood that various modifications are contemplated.

What is claimed is:

1. A storage control device comprising:
a flash memory-based storage including at least a first memory region storing first data for later access and a second memory region storing second data for later access; and
one or more controllers configured to:
enable access to the flash memory-based storage, and
independently control power supplied to the memory regions by controlling switches that enable or disable power to a memory region, such that the first memory region storing the first data for later access and the second memory region storing the second data for later access are not concurrently provided power for data access, the switches being configured to disable the power when a counter has determined that the memory region has not been accessed for a predetermined period of time;
a PCI express interface configured to connect the flash memory-based storage and a host through the PCI express interface; and
a format converter configured to:
upon receiving an indication of a memory access of the flash memory-based storage, perform data format conversion between a data format compatible with the PCI express interface and a second data format compatible with the host,
upon completing the data format conversion, perform address format conversion between a first address format compatible with the PCI express interface and a second address format compatible with the host, and
verify the conversion between the first and second address formats, and upon verifying a successful conversion between the first and second address formats, select one of the memory regions for reading or writing.

2. The storage control device of claim 1, wherein the one or more controllers include a hard disk drive interface controller and a memory interface controller which are based on a peripheral component interconnect (PCI) Express 4× interface.

3. The storage control device of claim 1, wherein the flash memory-based storage is grouped into memory regions that are configured for independent control.

4. The storage control device of claim 3, further comprising a power controller configured to independently control power to the memory regions through the switches corresponding to different memory regions such that the first memory region storing the first data for later access and the second memory region storing second data for later access are not concurrently provided power for data access.

5. The storage control device of claim 4, wherein the switches control power to each memory region by providing or denying power to each memory region.

6. The storage control device of claim 5, wherein the one or more controllers include a memory interface controller which includes a counter configured to monitor access to the memory regions such that power to a memory region not accessed for a predetermined amount of time is denied through the switches.

7. The storage control device of claim 1, wherein the flash memory-based storage is grouped into blocks that are configured for independent control.

8. The storage control device of claim 1, wherein the flash memory-based storage is physically or logically partitioned into partitions that are configured for independent control.

9. The storage control device of claim 8 further comprising a switch configured to supply power to each partition such that each partition is controlled through the switch.

10. The storage control device of claim 9, wherein the one or more controllers include a memory interface which includes a counter configured to monitor access to the partitions such that power to a partition not accessed for a predetermined amount of time is denied through the switch.

11. The storage control device of claim 1, wherein the one or more controllers include a memory interface controller which is configured to enable a hard disk drive interface controller to access the flash memory-based storage.

12. The storage control device of claim 1, wherein the one or more controllers include a hard disk drive interface controller which is configured to enable access to the flash memory-based storage.

13. The storage control device of claim 1, wherein the flash memory-based storage is a structure grouped as a plurality of memory regions, and includes a power controller controlling power to each grouped region.

14. The storage control device according to claim 13, wherein the power controller provides or denies power to a corresponding memory region according to whether each grouped memory region is accessed or not.

15. The storage control device according to claim 13, wherein the flash memory-based storage is grouped into blocks that are configured for independent control.

16. The storage control device according to claim 13, wherein the flash memory-based storage is physically or logically partitioned into partitions that are configured for independent control.

17. The storage control device of claim 1 further comprising a parallel-based memory access interface structure provided between a memory interface controller and the flash memory-based storage.

18. The storage control device of claim 17, wherein the one or more controllers include a hard disc drive interface controller and a memory interface controller which are based on a PCI Express 4× interface.

19. The storage control device of claim 17, wherein the flash memory-based storage is grouped into memory regions that are configured for independent control.

20. The storage control device of claim 17, wherein the one or more controllers include a memory interface controller which interacts with the format converter.

21. The storage control device of claim 1 wherein the flash memory-based storage is a structure in which the flash memory is grouped into memory regions, each memory region is defined as a block, and a flash memory access is executed in parallel to each block.

22. The storage control device of claim 21, wherein the one or more controllers include a hard disc drive interface controller and a memory interface controller which are based on a PCI Express 4× interface.

23. The storage control device of claim 21, wherein the one or more controllers include a memory interface controller which interacts with the format converter.

24. The storage control device of claim 1, wherein the storage control device is configured to provide permanent storage for a computer system.

25. The storage control device of claim 24, wherein the computer system does not include a hard disk drive.

26. A storage control device, comprising:
a flash memory-based storage having a structure in which the flash memory is grouped into memory regions including at least a first memory region storing first data for later access and a second memory region storing second data for later access;
a PCI express interface configured to connect the flash memory-based storage and a host through the PCI express interface;
a format converter configured to:
upon receiving an indication of a memory access of the flash memory-based storage, perform data format conversion between a data format compatible with the PCI express interface and a second data format compatible with the host,
upon completing the data format conversion, perform address format conversion between a first address format compatible with the PCI express interface and a second address format compatible with the host, verify the conversion between the first and second address formats, and upon verifying a successful conversion between the first and second address formats, select one of the memory regions for reading or writing; and
a flash memory interface configured to independently control power supplied to the memory regions by controlling switches that enable or disable power to the memory region, such that the first memory region storing the first data for later access and the second memory region storing the second data for later access are not concurrently provided power for data access, the switches being configured to disable the power when a counter has determined that the memory region has not been accessed for a predetermined period of time.

27. The storage control device of claim 26, wherein the second data format is a format that is compatible with the flash memory interface.

28. The storage control device of claim 26, wherein a layer structure of the PCI express interface includes a transaction layer and a physical layer.

29. The storage control device of claim 28, wherein the transaction layer of the PCI express interface is configured to create a PCI Express interface format by adding a header and cyclic redundancy check to the first data format.

30. The storage control device of claim 28, wherein the physical layer of the PCI express interface is configured to create a PCI Express interface format by adding a header, frames, and a cyclic redundancy check to the first data format.

31. A storage control device comprising:
a flash memory-based storage including at least a first memory region storing first data for later access and a second memory region storing second data for later access; and one or more controllers configured to:
enable access to the flash memory-based storage, and
independently control power supplied to the memory regions by controlling switches that enable or disable power to the memory region, such that the first memory region storing the first data for later access and the second memory region storing the second data for later access are not concurrently provided power for data access, the switches being configured to disable the power when a counter has determined that the memory region has not been accessed for a predetermined period of time, wherein the flash memory-based storage is grouped into memory regions that are configured for independent control, wherein the one or more controllers includes a power controller for independently controlling the power to the memory regions through switches corresponding to the memory regions;

a PCI express interface configured to connect the flash memory-based storage and a host through the PCI express interface; and a format converter configured to:
upon receiving an indication of a memory access of the flash memory-based storage, perform data format conversion between a data format compatible with the PCI express interface and a second data format compatible with the host,
upon completing the data format conversion, perform address format conversion between a first address format compatible with the PCI express interface and a second address format compatible with the host,
verify the conversion between the first and second address formats, and
upon verifying a successful conversion between the first and second address formats, select one of the memory regions for reading or writing,
wherein the switches control power to each memory region by providing or denying power to each memory region, and the one or more controllers include a memory interface controller which includes a counter configured to monitor access to the memory regions such that power to a memory region not accessed for a predetermined amount of time is denied through one of the switches.

32. A storage control device for a computing system, the storage control device comprising:
a flash memory-based storage including at least a first memory region storing first data for later access and a second memory region storing second data for later access; and
one or more controllers configured to:
enable access to the flash memory-based storage, and
independently control power supplied to the memory regions by controlling switches that enable or disable power to a memory region, the switches being configured to disable the power when a counter has determined that the memory region has not been accessed for a predetermined period of time;
a PCI express interface configured to connect the flash memory-based storage and a host through the PCI express interface; and
a format converter configured to:
upon receiving an indication of a memory access of the flash memory-based storage, perform data format conversion between a data format compatible with the PCI express interface and a second data format compatible with the host,
upon completing the data format conversion, perform address format conversion between a first address format compatible with the PCI express interface and a second address format compatible with the host, and
verify the conversion between the first and second address formats, and upon verifying a successful conversion between the first and second address formats, select one of the memory regions for reading or writing.

* * * * *

UNITED STATES PATENT AND TRADEMARK OFFICE
CERTIFICATE OF CORRECTION

| | | |
|---|---|---|
| PATENT NO. | : 8,024,508 B2 | |
| APPLICATION NO. | : 11/689129 | |
| DATED | : September 20, 2011 | |
| INVENTOR(S) | : Sung-Ho Son | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this
Fourteenth Day of February, 2012

David J. Kappos
*Director of the United States Patent and Trademark Office*